United States Patent Office 2,862,029
Patented Nov. 25, 1958

2,862,029

NOVEL IMINOSULFUR DIFLUORIDES AND THEIR PREPARATION

William C. Smith, Wilmington, Del., assignor to E. I. du Pont de Nemours and Company, Wilmington, Del., a corporation of Delaware No Drawing. Application September 28, 1956
Serial No. 612,876

14 Claims. (Cl. 260—543)

This invention relates to new organic compositions containing fluorine, to processes for preparing these compositions and to the preparation of other organic compounds therefrom.

Compounds containing fluorine in chemical combination have achieved considerable technical importance in recent years because of unusual properties. Thus, certain inorganic fluorides are highly reactive materials, and are used as fluorinating agents or as catalysts. Other fluorine-containing compounds, especially volatile fluorine compounds having fluorine bonded to oxygen-free carbon, are inert and are used as refrigerants. Long chain compounds containing a plurality of fluorine atoms attached to carbon are generally characterized by a high degree of chemical stability and are used as lubricants or lubricant additives.

The preparation and properties of compounds with fluorine-carbon bonds have been studied extensively but little attention has been given to compounds containing a plurality of fluorine atoms attached to an atom other than carbon. No information is available on organic compositions containing carbon-nitrogen-sulfur bonds in which fluorine is attached to the sulfur atom.

This invention has as an object the preparation of catalysts for the polymerization of ethylenic compounds. A further object is the preparation of new organic intermediates. Another object is the preparation of materials for etching glass and metal surfaces. Still another object is the preparation of new organic compounds. Other objects will appear hereinafter.

These objects are accomplished by the present invention of organic compounds having two fluorine atoms attached to a tetravalent sulfur atom which in turn is bonded by a double bond to an organic imino group. These new organic compounds can be described generally as "iminosulfur difluorides." They are characterized by the group, $-N=SF_2$, joined to an organic radical free of substituents containing active hydrogen, as determined by the Zerewitinoff method [Ber. 40, 2026 (1907); J. Am. Chem. Soc. 49, 2815 (1927)], i. e., a radical inert to Grignard reagents. Preferably the total number of carbon atoms in the compound is from 1 to 10, inclusive. The organic radical joined to the $-N=SF_2$ group is preferably hydrocarbons or halohydrocarbon.

The organic compounds of this invention are characterized by high chemical reactivity and must be stored under anhydrous conditions. The compounds of low carbon content, for example, one to two carbons, are gaseous at room temperature; those of higher carbon content, for example, those containing three or more carbon atoms, are liquids or solids. They are distillable under reduced pressure.

The iminosulfur difluorides of this invention can be prepared by several processes. For compounds in which the number of carbon atoms in the group R (of the general formula $R-N=SF_2$) is two or more, a preferred process consists in reacting sulfur tetrafluoride with an organic compound containing an isocyanate group. The reaction proceeds according to the general equation:

(1) 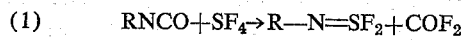 $RNCO+SF_4 \rightarrow R-N=SF_2+COF_2$

For compounds in which the number of carbon atoms in R is two or more and in which the nitrogen atom in the iminosulfur difluoride is bonded to R through a difluoromethylene group, the preferred process consists in reacting sulfur tetrafluoride with an organic compound containing a cyano group. The reaction proceeds according to the following equation:

(2)  $R-CN+SF_4 \rightarrow R-CF_2-N=SF_2$

In these processes additional fluorine atoms may be introduced into the compound through side reactions on the carbon joined to the cyano or isocyanate group of the starting compound. The side reaction, if it occurs, is advantageous to the process if a more highly fluorinated product is desired.

For the preparation of a single carbon iminosulfur difluoride, namely, trifluoromethyliminosulfur difluoride, a cyanogen halide, such as ClCN or BrCN, is reacted with sulfur tetrafluoride as probably shown by the following equation:

(3)  $8BrCN+10SF_4 \rightarrow 8CF_3-N=SF_2+3Br_2+S_2Br_2$

Another simple process for synthesizing trifluoromethyliminosulfur difluoride is by reaction of sulfur tetrafluoride with an inorganic cyanide, probably according to such an equation as:

(4) 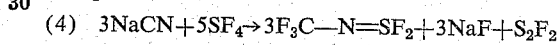 $3NaCN+5SF_4 \rightarrow 3F_3C-N=SF_2+3NaF+S_2F_2$

Other inorganic cyanides such as those of the alkali metals, KCN especially, and alkaline earth metals can be substituted for the sodium cyanide of Equation 4. It should be noted that the reaction products of Equations 3 and 4 other than the difluoride have not been positively identified.

It will be seen that the processes of this invention are quite broad. In fact, any compound having an acyclic group of up to three atoms, said group comprising but one carbon atom, which carbon atom is tetravalent and multiply bonded to a sole nitrogen atom, any remaining atom in said group being oxygen or hydrogen, can be reacted in the process of the present invention with sulfur tetrafluoride, the product of the reaction being an organic iminosulfur difluoride. For example, there can be used as reactant a compound $R-C\equiv N$, where R is an organic radical, a halogen atom or an alkali or alkaline earth metal; a compound $R-N=C=O$, where R is an organic radical; or a compound $R-N=CH-R'$ (Schiff's base) where R and R' are organic radicals. It will be understood that all of the organic precursors, like the products, should be free of Zerewitinoff active hydrogen.

Sulfur tetrafluoride can be prepared by methods described in the literature (Brown and Robinson, J. Chem. Soc. 1955, 3147–51).

Each of the described processes for obtaining the compounds of this invention is conducted under substantially anhydrous conditions. The reaction is carried out in a vessel whose inner surface is composed of a material resistant to chemical attack by hydrogen fluoride and the iminosulfur difluorides. Surfaces of stainless steel and "Hastelloy" C are suitable. "Hastelloy" C is the trade name of a well-known alloy of nickel, iron and molybdenum. The air in the reaction chamber is preferably displaced with an inert gas, for example nitrogen, before the reactants are charged into the chamber. The organic compound containing nitrogen multiply bonded to a carbon atom is preferably charged into the chamber first followed by the sulfur tetrafluoride. The mole ratio of the sulfurtetrafluoride to the nitrogen-containing compound is preferably not less than 1 or more than 4. The contents of the reaction vessel are mixed during the reaction period by suitable means, such as mechanical stirring or shaking. The temperature of the reaction is kept as low as possible to avoid formation of undesirable byproducts from decomposition of reactants and will preferably lie between 25° and 350° C. The pressure during the reaction is conveniently autogenous, generally between 5 and 50 atmospheres, but pressures outside this range can be used. The reaction time usually lies between 2 and 48 hours. The conditions chosen for maximum yield of product will be determined by the chemical reactivity and thermal stability of the products.

The following examples, in which the proportions of reactants are given as parts by weight, illustrate the methods of preparing the new organic iminosulfur difluorides but are not intended as limiting the invention.

Example I

This example shows the use of an aryl isocyanate in the preparation of an iminosulfur difluoride.

A bomb lined with "Hastelloy" C (capacity, 145 parts of water), was charged with 35.7 parts of phenyl isocyanate and 36 parts of sulfur tetrafluoride. The reactants were heated with shaking at 100° C. for 4 hours, 150° C. for 6 hours and then at 100° C. for 4 hours. The crude product (47.3 parts) was distilled at reduced pressure to obtain 38.7 parts of phenyliminosulfur difluoride, a light brown liquid boiling at 40° C. at 7.5 mm. pressure.

The reaction was repeated on a larger scale and a yield of 88% of phenyliminosulfur difluoride was obtained. The structure of the compound, $C_6H_5N=SF_2$, was confirmed by nuclear magnetic resonance studies and elementary analyses. The analytical data are as follows:

Calc'd for $C_6H_5N=SF_2$: C, 44.7%; H, 3.13%; N, 8.69%; S, 19.8%; F, 23.6%. Found: C, 44.12%; H, 3.40%; N, 8.27%; S, 19.76%; F, 24.00%.

Any aryl isocyanate can be employed in this process including tolyl isocyanate, p-chlorophenyl isocyanate, α-naphthyl isocyanate, 2,4-diphenyl diisocyanate and the like.

Example II

This example shows the application of the invention to aryl nitriles.

The bomb of Example I was charged with 20.6 parts of benzonitrile and 44 parts of sulfur tetrafluoride. The reactants were heated with shaking at 180° C. for 2 hours and then at 250° C. for 16 hours. A light green, clear liquid (41.3 parts) was obtained which, on distilling, yielded 28.0 parts of a pale yellow liquid boiling at 33° C. under 3 mm. pressure. The compound was identified as α,α-difluorobenzyliminosulfur difluoride, $$C_6H_5CF_2N=SF_2$$

by nuclear magnetic resonance studies and analysis for fluorine. In a subsequent run, the product was purified by careful fractional distillation and gave the following values on analysis:

Calc'd for $C_6H_5CF_2N=SF_2$: S, 15.18%; F, 35.99%. Found: S, 15.11%; F, 35.65%.

Example III

This example shows the use of an acetonitrile in the production of an iminosulfur difluoride.

The bomb of Example I was charged with 20.8 parts of trimethyl acetonitrile and 81 parts of sulfur tetrafluoride. It was heated at 200° C. for 1 hour, 250° C. for 10 hours and at 280° C. for 4 hours. There was obtained 37.1 parts of crude liquid reaction product which was distilled to obtain a fraction boiling at 99 to 102° C. This colorless liquid fraction was shown by nuclear magnetic resonance data and elementary analysis to be principally (1,1-difluoro-2,2-dimethylpropyl)iminosulfur difluoride, .

Any nitrile can be employed in the manner of this example including acetonitrile, adiponitrile, malononitrile, stearonitrile, and butyronitrile.

Example IV

This example illustrates the application of the invention to Schiff's bases.

The bomb of Example I was charged with 27.2 parts of N-benzylideneaniline and 33 parts of sulfur tetrafluoride. It was heated at 50° C. for 2 hours, 100° C. for 8 hours and finally at 140° C. for 2 hours. There was obtained 35.8 parts of a liquid which was shown by nuclear magnetic resonance analysis to be a mixture of α,α-difluorotoluene and phenyliminosulfur difluoride.

Sulfur tetrafluoride can be reacted with any Schiff's base, readily obtainable from a primary amine and an aldehyde or ketone to give the iminosulfur difluoride corresponding to the amine. Schiff's bases that can be employed include N-(p-chlorobenzylidene)aniline, N-butylidene-p-toluidine, N-phenylcyclohexaneimine and the like.

Example V

This example shows the use of a cyanogen halide in the preparation of an iminosulfur difluoride.

The bomb of Example I was charged with 42.4 parts of cyanogen bromide and 88 parts of sulfur tetrafluoride. The reactants were heated at 150° C. for 2 hours and then at 200° C. for 14 hours. The volatile reaction product was transferred to a stainless steel cylinder previously cooled in liquid nitrogen. On distillation there was obtained 22 parts of material boiling at −11° C. which was shown by mass spectrometric analysis to be trifluoromethyliminosulfur difluoride.

Example VI

This example shows the use of an inorganic cyanide in the process of the invention.

The bomb of Example I was charged with 9.8 parts of sodium cyanide and 66 parts of sulfur tetrafluoride. The reactants were heated at about 200° C. for 2 hours, 250° C. for 8 hours and 300° C. for 2 hours. The volatile reaction product was transferred to a stainless steel cylinder previously cooled in liquid nitrogen. It was shown by mass spectrometric analysis to contain approximately 12 parts of trifluoromethyliminosulfur difluoride.

The present invention is generic to organic compounds having the monovalent radical —N=SF$_2$ joined to a monovalent organic radical. The compounds have the general formula R—N=SF$_2$ wherein R is an organic radical free of Zerewitinoff active hydrogen. The invention therefore comprises compounds wherein R is a saturated or unsaturated hydrocarbon. R can contain oxygen and sulfur atoms in the chain. R can be alkyl (butyl), alkenyl (butenyl), aromatic (phenyl), aralkyl (phenylethyl), cycloaliphatic (cyclohexyl), halogenated alkyl (β-chloroethyl), halogenated aromatic (p-cholorphenyl), nitroaromatic (p-nitrophenyl), alkoxyalkyl (β-ethoxyethyl) and alkoxyaryl (p-methoxyphenyl). R can also contain on the carbon atoms substituents free of basic primary and secondary nitrogen atoms and of active hydrogen atoms. Thus R can be, in addition to those given above, as follows: methyl, ethyl, octyl, dodecyl, cyclopentyl, methylcyclohexyl, cyclohexyldifluoromethyl, xylyl, naphthyldifluoromethyl, p-chloro-α,αdifluoro-benzyl, chlorophenyl, perfluoroethyl, tetrafluoroethyl, methylthioethyl, methoxyethoxyethyl, allyl and octenyl.

The reactants used to prepare the iminosulfur difluorides are well-known organic compounds which in many cases are available in commercial quantities. For example, compounds readily available for use in the above processes are acetonitrile, butyronitrile, and stearonitrile. The reactants are not limited to monosubstituted products; disubstituted products such as adiponitrile and malonitrile can be used to prepare bis-iminosulfur difluorides.

The reactions can be performed in a continuous flow system wherein the reactants are cycled through a hot tube with continuous removal of the iminosulfur difluoride.

The compounds of this invention are useful as catalysts for polymerization of ethylenic compounds. For example, tetrafluoroethylene heated to 166° C. for approximately 14 hours in the presence of trifluoromethyliminosulfur difluoride was polymerized to polytetrafluoroethylene. Similarly butadiene was polymerized with trifluoromethyliminosulfur difluoride.

The compounds are also useful as etching agents for glass and metal surfaces, for example, aluminum and zinc, whereby attractive designs are imparted to the surfaces.

The compounds are highly reactive materials and can be used as intermediates for preparation of other useful products as is shown in Examples A and B below.

*Example A.—Phenyliminosulfur bismethoxide*
$C_6H_5N=S(OCH_3)_2$

A flask (capacity, 125 parts of water) was charged with 10.8 parts of sodium methoxide and 64 parts of methanol. To this solution 16.1 parts of phenyliminosulfur difluoride was added dropwise with stirring. During the addition the reaction temperature was maintained at 20° to 27° C., using ice-water for cooling when necessary. The solid sodium fluoride which formed was separated by filtration and the filtrate concentrated under nitrogen on a steam bath. Benzene was added to the concentrated solution and the additional sodium fluoride which precipitated was separated by filtration. After removal of benzene by distillation the residue was distilled under reduced pressure. There was obtained 9.2 parts of phenyliminosulfur bismethoxide, an orange liquid which boiled at 122° C. under 8 mm. pressure of mercury. The analytical data on the product were as follows:

*Analysis.*—Calculated for $C_8H_{11}O_2NS$: C, 51.8%; H, 6.01%; S, 17.3%. Found: C, 50.9%, 50.8%; H, 6.08%, 6.27%; S 16.8, 17.1.

*Example B.—Triphenylsulfilimine,* $C_6H_5N=S(C_6H_5)_2$

In an apparatus similar to that used in the preceding example, a solution of 16.8 parts of phenyllithium in 94 parts of diethyl ether was prepared. To this solution there was added gradually and with vigorous stirring a solution of 16.1 parts of phenyliminosulfur difluoride in 70 parts of diethyl ether. Initially the reaction was very vigorous but gradually became more moderate, the reaction temperature being controlled by the boiling point of the refluxing ether. The crude, quite dark, reaction mixture was freed of solid by filtration under nitrogen. After removal of the ether by distillation the liquid residue was distilled under reduced pressure to yield 11.2 parts of impure triphenylsulfilimine, an orange liquid boiling at 45° to 133° C. at 6 mm. pressure of mercury. Redistilltaion of this liquid yielded 1.3 parts of liquid boiling at 133°–137° C. at 10 mm. and 4.2 parts boiling at 110°–114° C. at 2 mm. pressure. Analytical data on both fractions were in agreement with the calculated values for triphenylsulfilimine.

*Analysis.*—Calculated for $C_6H_5N=S(C_6H_5)_2$: C, 77.9%; H, 5.47%. Found, product boiling 133–137° C./10 mm.: C, 77.3%; H, 5:76%. Found, product boiling 110-114° C./2 mm.: C, 77.3%; H, 5.83%.

Trifluoromethyliminosulfur difluoride can be converted to tetrafluoroethylene by passage through a carbon arc.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. Organic compounds characterized by the group —$NSF_2$ joined to a monovalent organic radical free of Zerewitinoff active hydrogen.
2. Organic compounds characterized by the group —$NSF_2$ joined to a monovalent organic radical of one to ten carbons and free of Zerewitinoff active hydrogen.
3. Organic compounds characterized by the group —$NSF_2$ joined to a monovalent hydrocarbon radical of one to ten carbons free of Zerewitinoff active hydrogen.
4. Organic compounds characterized by the group —$NSF_2$ joined to a monovalent halogenohydrocarbon radical of one to ten carbons free of Zerewitinoff active hydrogen.
5. Phenyliminosulfur difluoride.
6. Trifluoromethyliminosulfur difluoride.
7. Phenyldifluoromethyliminosulfur difluoride.
8. 1,1-difluoro-2,2-dimethylpropyliminosulfur difluoride.
9. Process for the preparation of an organic iminosulfur difluoride which comprises reacting sulfur tetrafluoride with a member of the group consisting of cyanogen halides, alkali and alkaline earth metal cyanides, nitriles, organic isocyanates, and Schiff's bases, the organic reactants being free of Zerewitinoff active hydrogen.
10. Process for the preparation of organic iminosulfur difluorides which comprises reacting sulfur tetrafluoride with an organic isocyanate free of Zerewitinoff active hydrogen.
11. Process for the preparation of organic iminosulfur difluorides which comprises reacting sulfur tetrafluoride with an organic nitrile free of Zedewitinoff active hydrogen.
12. Process for the preparation of organic iminosulfur difluorides which comprises reacting sulfur tetrafluoride with a Schiff's base free of Zerewitinoff active hydrogen.
13. Process for the preparation of trifluoromethyliminosulfur difluoride which comprises reacting sulfur tetrafluoride with a cyanogen halide.
14. Process for the preparation of trifluoromethyliminosulfur difluoride which comprises reacting sulfur tetrafluoride with an inorganic cyanide.

No reference cited.